United States Patent [19]

Generke et al.

[11] 3,979,971

[45] Sept. 14, 1976

[54] DIFFERENTIAL DRIVE

[75] Inventors: William A. Generke; Hugh W. O'Connor, both of Scituate, Mass.

[73] Assignee: Hills-McCanna Company, Carpentersville, Ill.

[22] Filed: Mar. 3, 1975

[21] Appl. No.: 554,688

[52] U.S. Cl. ................................ 74/626; 74/802; 74/424.8 R
[51] Int. Cl.² ........................................ F16H 33/00
[58] Field of Search .......... 74/625, 626, 770, 424.8, 74/802

[56] References Cited
UNITED STATES PATENTS

| | | | |
|---|---|---|---|
| 2,397,068 | 3/1946 | Wilson | 74/626 |
| 2,420,552 | 5/1947 | Morrill | 74/626 |
| 2,481,477 | 9/1949 | Peery | 74/626 |
| 2,753,030 | 7/1956 | Wight | 74/625 |
| 3,028,352 | 6/1962 | Murphy | 74/626 |

*Primary Examiner*—Samuel Scott
*Assistant Examiner*—Wesley S. Ratliff, Jr.
*Attorney, Agent, or Firm*—Melvin R. Stidham

[57] ABSTRACT

A differential drive in which a reference sprocket is stationary for power drive and rotated for manual drive. In power drive, planet sprockets are orbited around the reference sprocket and rotated thereby. Drive planet sprockets on the same shafts drive an output sprocket at a slightly different ratio from the reference drive as they orbid around it, whereby there is a slow net rotation imparted thereto. In manual drive, the planet shaft axes are fixed and the reference wheel is rotated to drive the planet sprockets and rotate the output sprocket.

6 Claims, 4 Drawing Figures

DIFFERENTIAL DRIVE

BACKGROUND OF THE INVENTION

This invention is intended as an improvement to the "Differential Harmonic Drive" disclosed in co-pending U.S. application Ser. No. 427,634, filed Dec. 26, 1973, by Pieter F. Hoos, now U.S. Pat. No. 3,868,867 granted Mar. 4, 1975. In that system the reference sprocket is stationary and the power drive operates as here proposed. However, for manual drive, the system was simply inactivated and a handwheel was coupled to the output, so that there was a direct drive, with no mechanical advantage.

OBJECTS OF THE INVENTION

It is an object of this invention to provide a differential drive which may be selectively operated either manually or from a power source with a substantial mechanical advantage in either case.

It is a further object of this invention to provide a valve operator offering a choice of mechanical drives.

It is a further object of this invention to provide a valve operator which lends itself in design to meet a wide range of torque requirements.

Other objects and advantages of this invention shall become apparent from the description to follow when read in conjunction with the accompanying drawings.

BRIEF SUMMARY OF THE INVENTION

In carrying out this invention, there is provided a differential drive including a reference sprocket which is fixed to a worm gear whereby engagement of the worm gear with the worm when not driven, locks the worm gear and reference sprocket against rotation. The power input is delivered to an input wheel or wave generator on which are rotatably carried a pair of diametrically opposed planet shafts. Rotation of the wave generator orbits the planet shafts about the now-stationary reference sprocket and an output sprocket. Driving engagement of sprockets on the planet shafts with the reference sprocket imparts rotation to the planet shafts, and the drive planet sprockets on the same shafts drive the output sprocket. The step-down ratio in the output drive is slightly different than the step-up ratio of the reference drive whereby there is a small net rotation, either positive or negative depending upon the ratios, imparted to the output sprocket. Hence, the output sprocket is rotated slowly as the planet shafts orbit around it. For manual operation, the wave generator is locked against rotation to fix the axes of the planet shafts, and the reference sprocket is rotated manually through the worm gear drive. Hence, the reference sprocket transmits rotation to the planet shafts to drive the output sprocket.

DESCRIPTION OF A PREFERRED EMBODIMENT

Figure 1:
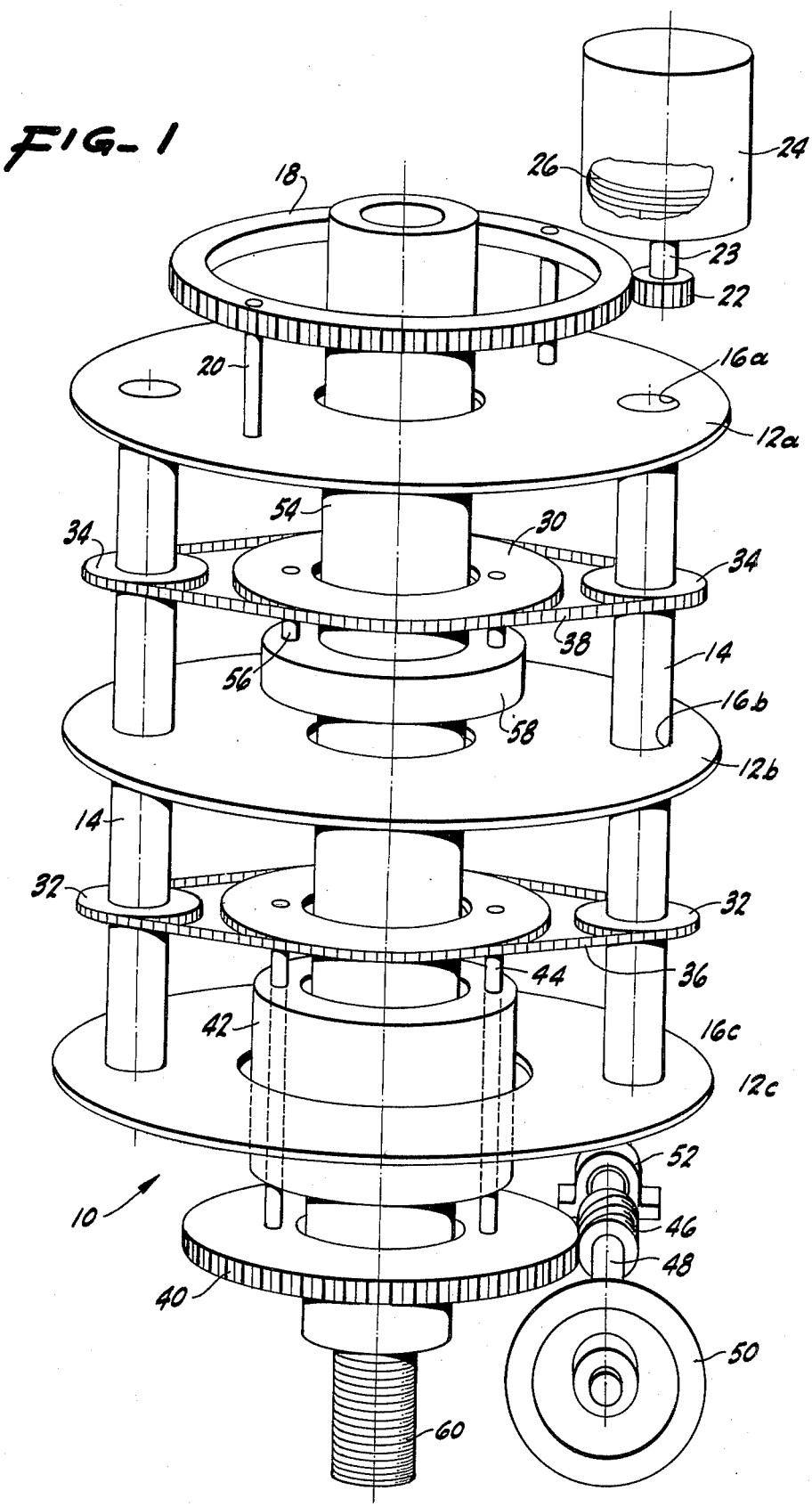
FIG. 1 is a schematic isometric view of a differential drive embodying features of this invention.

Referring now to FIG. 1 with greater particularity, the differential drive 10 of this invention includes an input wheel or wave generator 12 which may take the form of a series of wheels 12a, 12b and 12c which are interconnected by a pair of diametrically opposed planet shafts 14 rotatably carried thereon in the bearings 16a, 16b, and 16c. The input wheel is rotated with a gear ring 18 which may be secured to the top wheel 12a, as by means of pins 20. The gear 18 is driven by a pinion 22 carried on the drive shaft 23 of a motor 24. The motor 24 is of the type having a brake 26 thereon which locks the pinion 22 against rotation when the motor 24 is de-energized and releases upon energization of the motor.

As the input wheel 12 is rotated, it orbits the planet shafts 14 about a reference sprocket 28 and an output sprocket 30. Reference planet sprockets 32 and drive planet sprockets 34 on the planet shafts 14 are drivingly connected by chains 36 and 38 to their respective sprocket wheels.

The reference sprocket 28 is secured to a worm gear 40, as by means of a common hub 42 and pins 44. A worm 46 which is carried on a shaft 48 to be rotated by a hand wheel is rotatably mounted in stationary bearings 52 whereby the worm gear set 40, 46 holds the reference sprocket 28 stationary except when it is rotated by the worm gear itself.

In power drive operation, the motor 24 is energized whereby the brake is released and the wave generator 12 is rotated to orbit the planet shafts 14 about the reference sprocket 28. Engagement of the chain 36 on the reference sprocket with the reference planet sprockets 32 imparts rotation to the planet shafts 14, whereby the drive planet sprockets, which are on the same shafts and, hence, rotating at the same speed, will tend to drive the output sprocket 30 as they orbit about it. The step-down drive ratio of the drive planet 34 and output sprockets 30 is slightly different than the step-up ratio of the reference sprocket 28 and its planet sprocket 32 whereby there is a small net or differential rotation, and the output sprocket 30 will be rotated slowly as the planet sprockets 34 orbit about it. The direction of rotation will depend upon whether the differential is positive or negative.

Rotation of the output sprocket rotates a drive nut 54 to which the sprocket is secured by pinning it at 56 to a shoulder or flange 58 on the nut. Rotation of the nut 54 raises or lowers a threaded stem 60 as may be found on gate valves, globe valves and the like.

From the equation developed in the aforesaid pending Hoos application, the overall ratio, $R_H$ of the system is determined by the equation:

$$R_H = \frac{1}{1 - \frac{R_S}{R_A}}$$

Where $R_S$ is the ratio of the reference drive and $R_A$ is the ratio of the output drive.

For example, with $R_S = 2.3$ and $R_A = 2.1$:

$$R_H = \frac{1}{1 - \frac{2.3}{2.1}} = \frac{1}{1 - 1.1}(\text{approx.}) = -\frac{10}{1}$$

For manual operation, the motor 24 is de-energized whereby the brake 26 is actuated to hold the drive pinion 22 against rotation, locking the wave generator 12, and hence, the axes of the planet shafts 14, in place. Then, when the handwheel 50 is rotated, the worm turns the worm gear at its designed ratio, say 50:1 to rotate the reference sprocket 28 and impart rotation to the reference planet sprocket 32 and, with it, the drive planet sprocket 34. Because the ratios of the reference drive and output drive are nearly equal, e.g. 2.3 and 2.1 the changes in speed and torque are very slight. Hence, the efficiency of the manual operation of this system is comparable to that of any manual worm gear drive, such as are widely used in the operation of valves.

Figure 2:
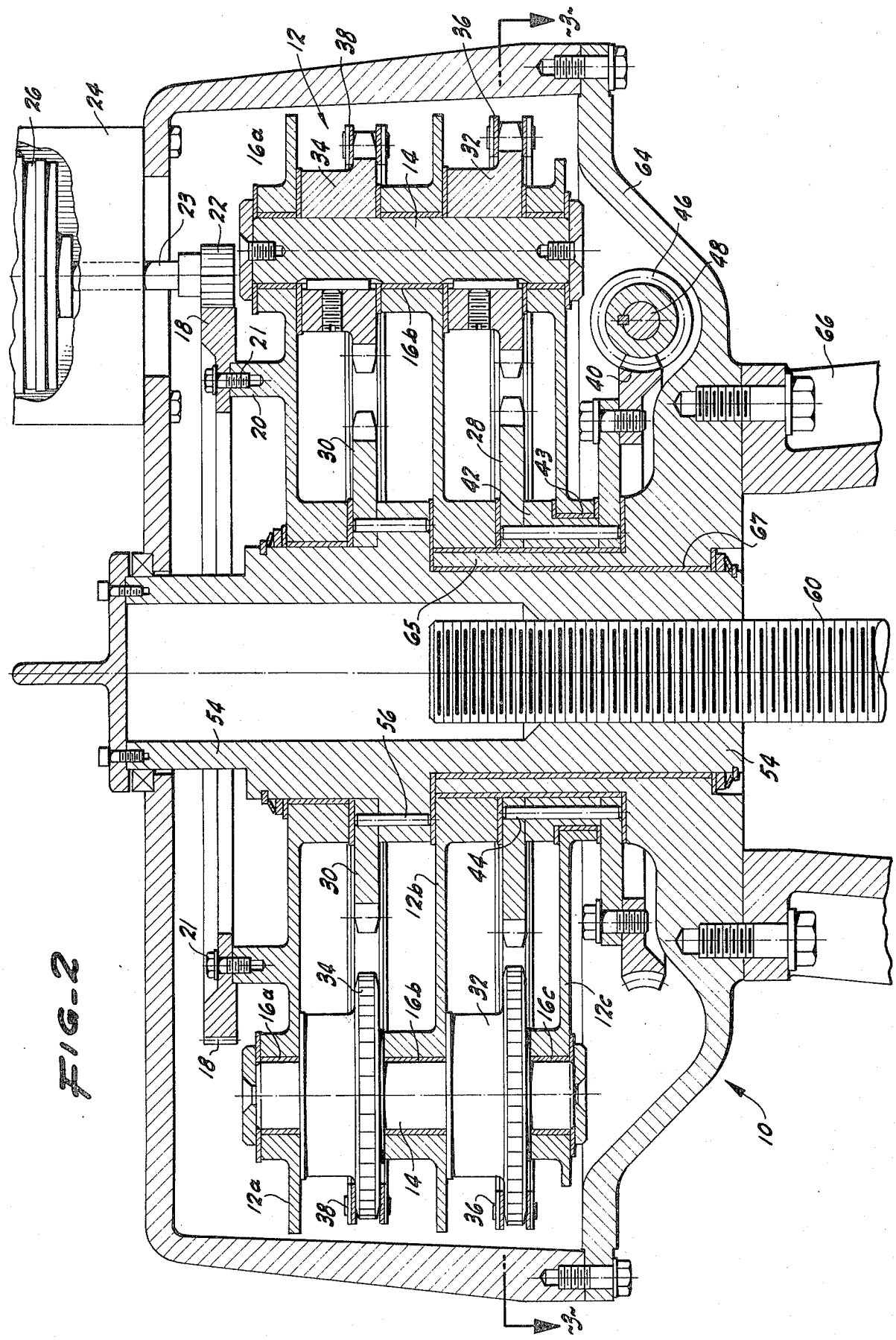
FIG. 2 is a vertical cross-section of a mechanical embodiment of the differential drive.

Referring now to FIG. 2 the differential drive 10 is shown contained within a housing 64 which may be mounted on the yoke 66 of a valve, such as a gate valve (not shown), with the stem 60 of the valve threadedly engaged in the internally threaded drive nut 54 on which the output sprocket is secured 30, as by means of pins 56. Mounted on the housing 64 is the drive motor 24 with the built-in brake device 26. Carried on the drive shaft of the motor 24 is a pinion 22 drivingly engaged with a ring gear 18 secured to the wave generator 12 as by means of posts 20 and cap screws 21.

Rotatably mounted on the wave generator 12, in bearings 16a, 16b, and 16c are the planet shafts 14 to which are keyed the reference planet sprockets 32 and the drive planet sprockets 34. A hub 42, which is secured to the reference sprocket 28 and to the gear ring 40 by means of pins 44 has a bearing member 43 thereon which rotatably supports the lower disc 12c of the wave generator.

Similarly, a sleeve extension 65 of the housing 64 rotatably supports the intermediate disc 12b of the wave generator and has a bearing sleeve 67 therein in which the threaded drive nut 54 is rotated.

As previously described, energization of the motor 24 will release the brake 26 and allow the pinion to drive the ring gear 18 and, hence, the wave generator 12, orbiting the planet shafts 14 about the reference and output sprockets 28 and 30. The chain 36 engaging the reference sprocket 28 imparts rotation to the planet shafts 14 through the reference planets 32, thereby rotating the output drive sprocket 34 at the same speed. As a result, the output sprocket and the threaded drive nut 54 are rotated slowly as the drive planet 34 orbits around it.

Similarly, in manual operation, the motor 24 is de-energized to brake the input pinion 22 and the worm 46 is rotated to rotate the worm gear and the reference sprocket 28 carried thereon at the designed reduction ratio, the reference sprocket imparting rotation to the reference planet sprocket 32 and the drive planet sprocket 34, to rotate the output sprocket.

If, during manual operation with the handwheel 50 and worm gear drive 40, 46, the motor 24 is inadvertently activated, there is no danger of injury. There would be a small change in torque, but one could operate the handwheel while the motor is operating. The only effect is an increase or decrease in operating time, depending upon whether the manual and motor operation output were in the same or opposite directions.

Figure 3:
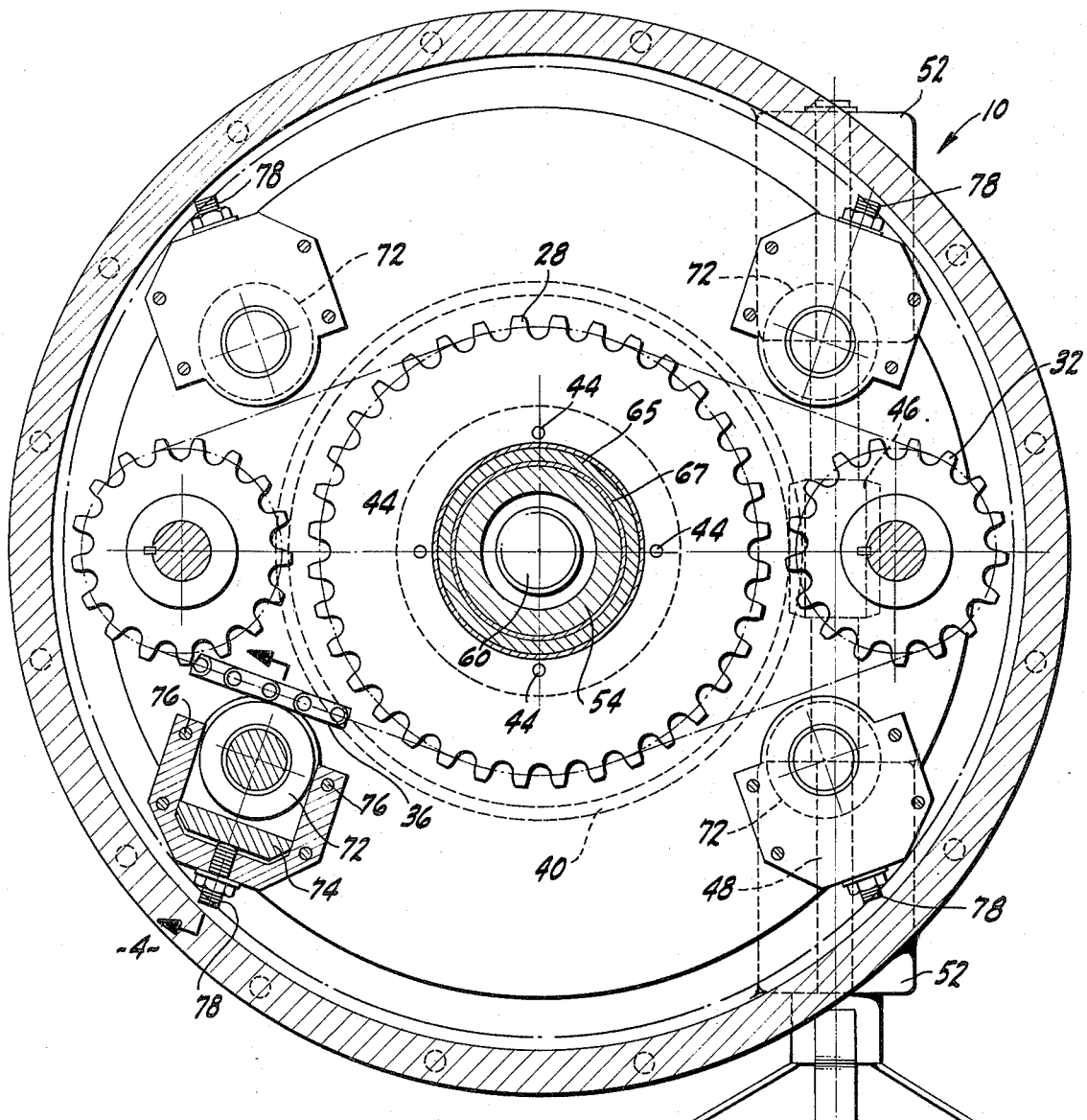
FIG. 3 is in horizontal section view taken along line 3—3 of FIG. 2.
Figure 4:
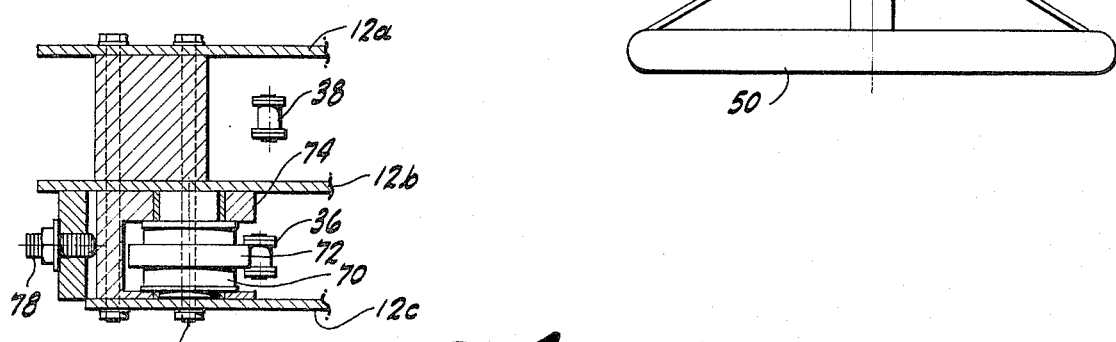
FIG. 4 is a partial section view taken along line 4—4 of FIG. 3.

As shown in FIGS. 3 and 4, the tension in the chains may be adjusted and maintained by pressing rollers 70 against the chains. A central, radial enlargement 72 on the roller engages between the links of the sprocket chain to maintain the sprocket chain taut. The rollers may be rotatably carried in sub-frame 74 which are slidably carried on the Wave generator 12 and secured in place by screws 76. The desired tension may be achieved by threaded adjustment screws 78.

While this invention has been described in conjunction with a preferred embodiment thereof, it is obvious that modifications and changes therein may be made by those skilled in the art without departing from the spirit and scope of this invention as defined by the claims appended hereto.

What is claimed as invention is:

1. A differential drive comprising:
a rotary input member rotatable about an axis;
a planetary shaft on said input member displaced from and parallel to said axis;
first and second planetary wheels rotatable together on said shaft;
first and second complementary wheels on said axis;
first and second motion transmitting means between said first planetary and complementary wheels and between said second planetary and complementary wheels, respectively;
said second complementary wheel being adapted to deliver a rotary output;
the rotary drive ratio between said first planetary and complementary wheels being nearly equal to but slightly different than that between said second planetary and complementary wheels;
first drive means for rotating said input member;
means locking said first drive means when not in operation; and
second drive means for rotating said first complementary wheel comprising:
a worm gear fixed to said first complementary wheel; and
a worm rotatably carried in stationary bearings to lock said worm gear when idle.

2. The differential drive defined by claim 1 including:
manually operable means for rotating said worm.

3. The differential drive defined by claim 1 including:
a selectively operated brake in said first drive means.

4. The differential drive defined by claim 1 wherein:
at least one of said first and second motion transmitting comprises a chain and sprocket connection.

5. The differential drive defined by claim 1 including:
an output member rotatable on said axis; and
means coupling said output member to said second complementary wheel.

6. The differential drive defined by claim 1 including:
a second shaft on said input member displaced from and parallel to said axis;
a pair of planetary wheels on said second shaft;
motion transmitting means between said planetary wheels and said complementary wheels; and
said shafts being spaced equally from said axis on a common pitch diameter.

* * * * *